United States Patent
Tajima

(10) Patent No.: US 7,796,290 B2
(45) Date of Patent: Sep. 14, 2010

(54) IMAGE FORMING DEVICE, IMAGE FORMING SYSTEM, AND COMPUTER READABLE MEDIUM

(75) Inventor: Yukio Tajima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 162 days.

(21) Appl. No.: 12/252,522

(22) Filed: Oct. 16, 2008

(65) Prior Publication Data

US 2009/0207437 A1 Aug. 20, 2009

(30) Foreign Application Priority Data

Feb. 18, 2008 (JP) .............................. 2008-035682

(51) Int. Cl.
*G06F 3/12* (2006.01)
*G06K 15/00* (2006.01)

(52) U.S. Cl. .................... 358/1.15; 358/1.16; 358/1.14; 358/1.13

(58) Field of Classification Search ................ 358/1.15, 358/1.16, 1.14, 1.13, 1.1, 400, 402; 705/51; 726/2

See application file for complete search history.

(56) References Cited

U.S. PATENT DOCUMENTS

2007/0253015 A1 11/2007 Eguchi et al.

FOREIGN PATENT DOCUMENTS

| JP | 2005-038435 A | 2/2005 |
|----|---------------|--------|
| JP | 2005-176405 A | 6/2005 |
| JP | 2007-296789 A | 11/2007 |
| JP | 2007-324956 A | 12/2007 |

OTHER PUBLICATIONS

Japanese Office Action dated Jul. 17, 2008.

*Primary Examiner*—Dov Popovici
*Assistant Examiner*—Thomas J Lett
(74) *Attorney, Agent, or Firm*—Sughrue Mion, PLLC

(57) ABSTRACT

An image forming device includes: a processing unit that executes a prescribed process; a user interface unit that displays information related to the executed process, and that receives a setting of content of the executed process; a communication unit that is connected to an external device, that obtains process content information and content of the setting in the user interface unit from the external device, and that obtains operator information; a storage that stores the process content information and the operator information so as to be coordinated with each other; a user specifying unit that specifies a user; and a control unit that controls content of a display specified based on the process content information to be displayed on the user interface unit, and considers content of a setting specified based on the process content information to be received by the user interface unit.

10 Claims, 4 Drawing Sheets

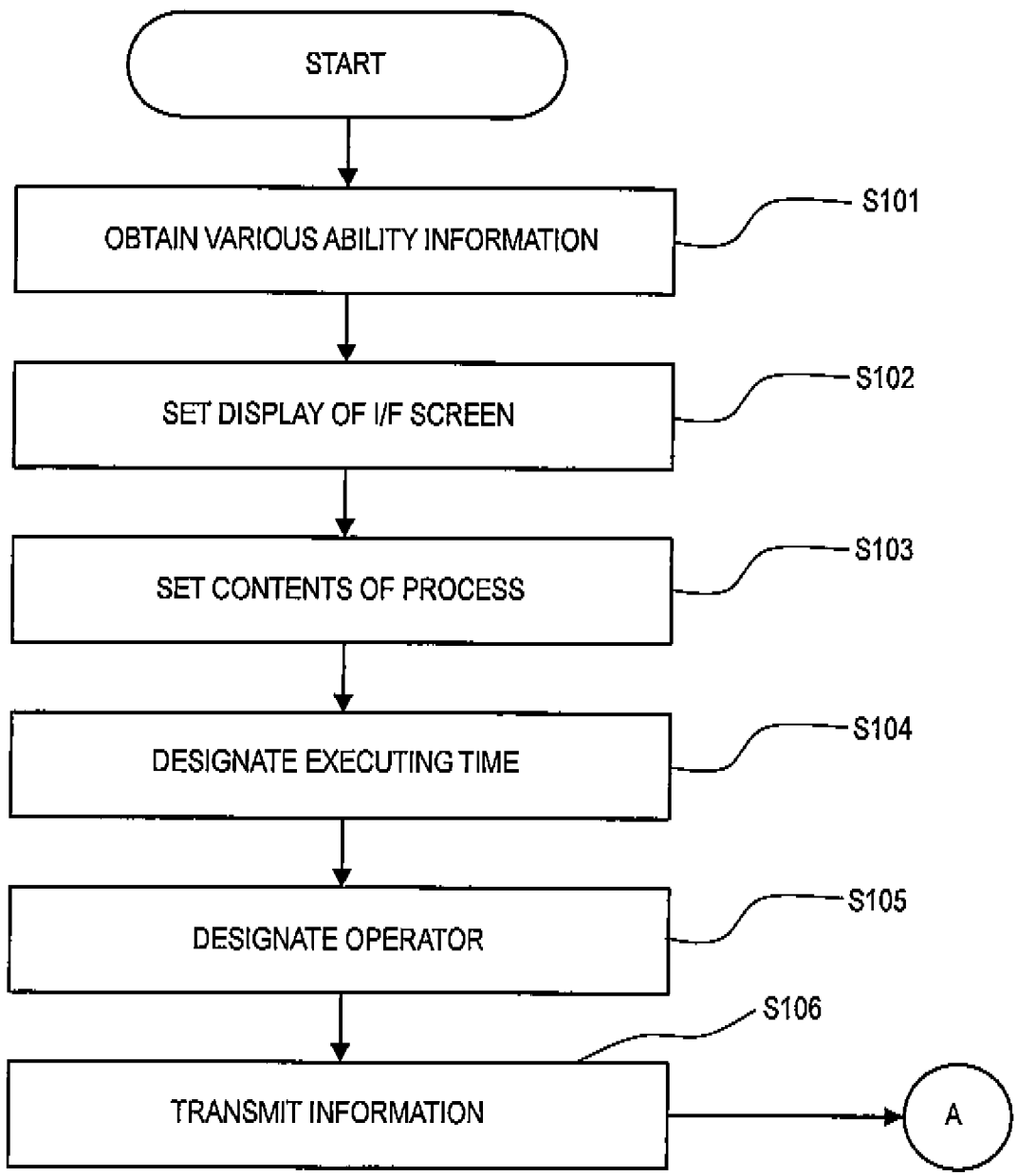

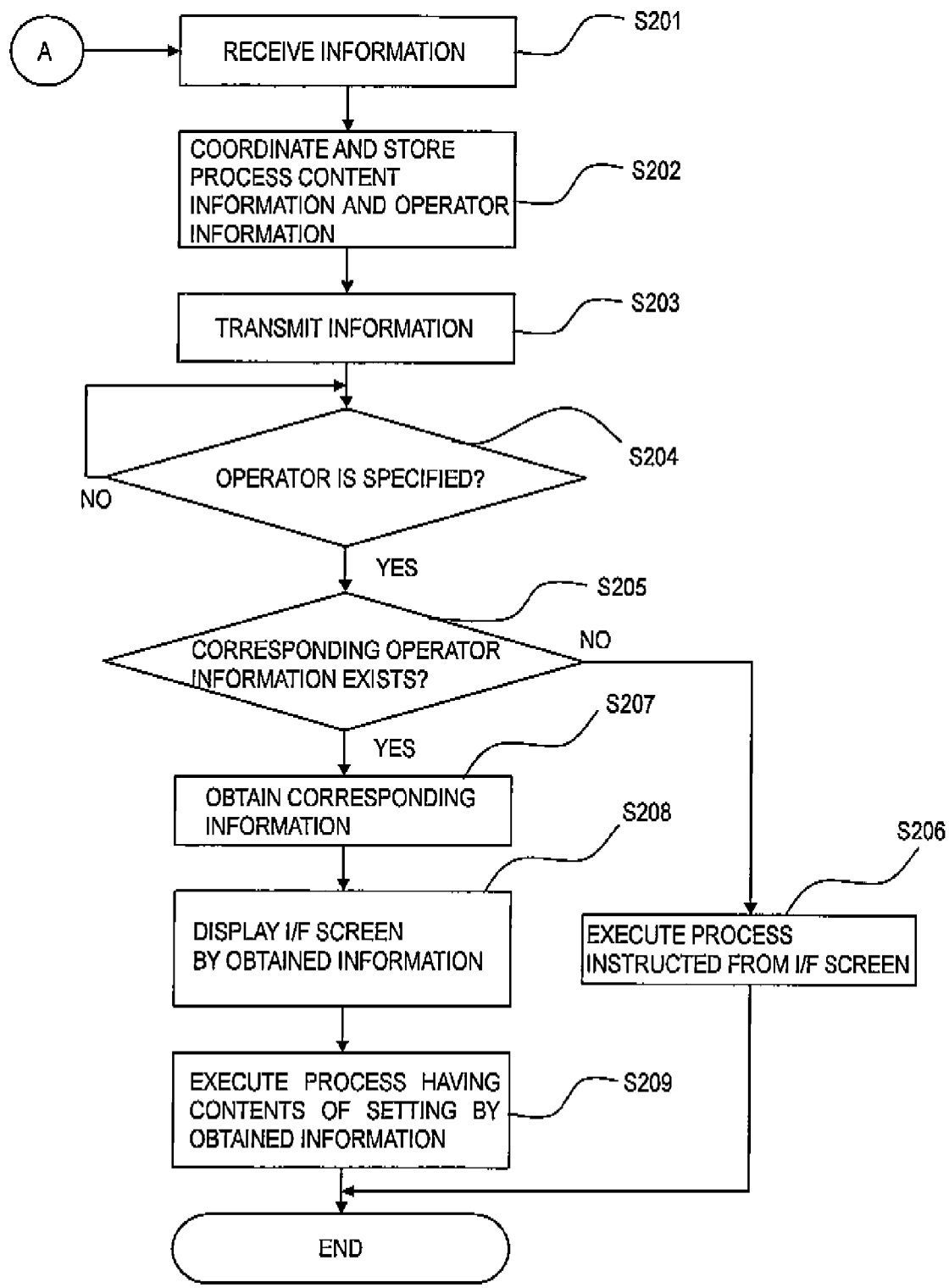

IMAGE FORMING DEVICE, IMAGE FORMING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-035682 filed Feb. 18, 2008.

BACKGROUND

Technical Field

The present invention relates to an image forming device, an image forming system, and a computer readable medium.

SUMMARY

According to an aspect of the present invention, an image forming device includes: a processing unit that executes a prescribed process; a user interface unit that displays information related to the process executed by the processing unit, and that receives a setting of content of the process executed by the processing unit; a communication unit that is connected to an external device through a communication line, that obtains process content information as information related to content of a display and content of the setting in the user interface unit from the external device, and that obtains operator information as information of an operator of content of a process specified by the process content information; a storage that stores the process content information and the operator information obtained by the communication unit so as to be coordinated with each other; a user specifying unit that specifies a user; and a control unit that, in a case where the user specified by the user specifying unit corresponds to the operator specified by the operator information stored in the storage, controls content of a display specified based on the process content information to be displayed on the user interface unit on the basis of the process content information stored in the storage so as to be coordinated with the operator information, and considers content of a setting specified based on the process content information to be received by the user interface unit.

BRIEF DESCRIPTION OF THE DRAWINGS

Exemplary embodiment of the present invention will be described in detail based on the following figures, wherein:

FIGS. 3A and 3B are flowcharts showing an example of basic process operations in the image forming system according to the present invention.

DETAILED DESCRIPTION

Figure 1:
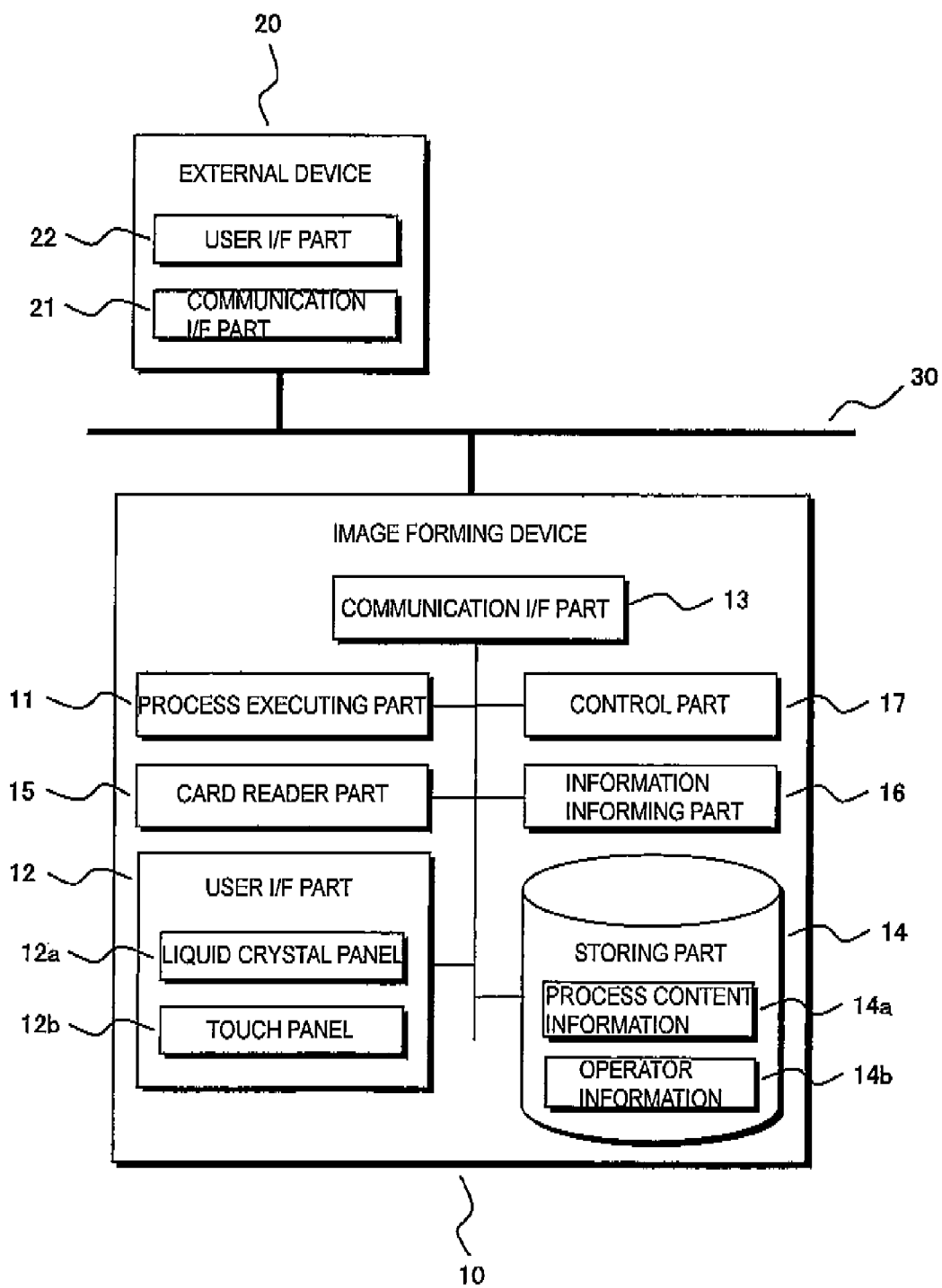
FIG. 1 is a functional block diagram showing one example of a schematic structure of an image forming system according to the present invention.

Now, an image forming device and an image forming system according to the present invention will be described below by referring to the drawings.

Initially, a schematic structure of the image forming system will be described.

FIG. 1 is a functional block diagram showing one example of a schematic structure of the image forming system.

The illustrated image forming system includes an image forming device 10, an external device 20 and a communication line 30 for connecting them. A plurality of the devices 10 and 20 may be respectively provided on the communication line 30.

The image forming device 10 includes a copying machine, a printer, a facsimile device or a device that combines these functions together to form or output an image in accordance with a request from a user. More specifically, the image forming device 10 includes a process executing part 11, a user interface (abbreviate an interface as an "I/F", hereinafter) part 12, a communication I/F part 13, a storing part 14, a card reader part 15, an information informing part 16 and a control part 17.

The process executing part 11 executes a prescribed process such as forming or outputting the image. That is, the process executing part 11 prints and outputs the image read from a copy, transmits the image by the facsimile device and transmits the image to a network, or prints and outputs image data received by an external facsimile transmission or a network transmission. Further, the process executing part 11 carries out a setting process (for instance, a setting process of an IP address necessary for receiving the image data by the network) necessary for executing such prescribed processes.

The user I/F part 12 is a part to be operated by the user of the image forming device 10 that displays information related to the processes (that is, the processes that can be executed in the process executing part 11) met by the process executing part 11 and receives the setting of the contents of the process which the user allows the process executing part 11 to carry out. Therefore, the user I/F part 12 includes a liquid crystal panel 12a for displaying information to the user by the display of an IF screen and a touch panel 12b for receiving the input of information from the user.

The communication I/F part 13 is connected to the external device 20 through the communication line 30 to transmit and receive information between the external device and the communication I/F part 13. In the information that the communication I/F part 13 transmits to and receives from the external device 20, are included below-described process content information 14a and operator information, or the information related to the processes met by the process executing part 11 (namely, information concerning what process functions the image forming device 10 includes) or the like. The communication line 30 to which the communication I/F part 13 is connected may be a wired type or a radio type. Further, a communication protocol on the communication line 30 is not especially limited and any of the communication protocols realized by using a well-known art may be employed.

The storing part 14 stores and holds the process content information 14a and the operator information 14b obtained by the communication I/F part 13 from the external device 20 so as to be coordinated with each other.

Here, the process content information 14a is information that is set in the external device 20 and transmitted from the external device 20 and means information related to the contents of the display and the contents of the setting in the user I/F part 12 in the image forming device 10. That is, the process content information 14a indicates information for specifying the contents of the processes that the process executing part 11 in the image forming device 10 is allowed to carry out.

Further, the operator information 14b means information related to an operator of the contents of the process specified by the process content information 14a. That is, the operator information 14b indicates the information for specifying the operator when the process executing part 11 in the image forming device 10 is allowed to carry out the process. The operator specified by the operator information 14b may be a transmitter himself or herself of the operator information 14b or another person who receives a request from the transmitter.

In the information 14a and 14b respectively, for instance, data specifying the contents of the display in the user I/F part 12 may be described by HTML (HyperText Markup Language), data for controlling an operation of the user I/F part 12 may be described by Javascript (a registered trademark) and data specifying the contents of the process that the process executing part 11 is allowed to execute may be described by XML (Extensible Markup Language). However, a data format thereof is not especially limited and any of the data formats realized by a well-known art may be employed.

The card reader part 15 reads information from an IC card held by the user of the image forming device 10 (specifically, a person who allows the process executing part 11 in the image forming device 10 to carry out the process) and carries out a user certifying process in accordance with a result obtained by reading the information to specify the user. The user does not necessarily need to be specified by using the card reader part 15, and other well-known art may be used, for instance, a log-in process is requested by inputting a password.

The information informing part 16 informs an information transmitted part specified by the operator information 14b that the communication I/F part 13 obtains the process content information 14a and the operator information 14b and the storing part 14 stores the process content information 14a and the operator information 14b. Specifically, for instance, such a process is carried out as to write an electronic mail and transmit the electronic mail to an electronic mail address specified by the operator information 14b. In that case, since the address may be extracted or the electronic mail maybe written by using a well-known art, an explanation thereof is omitted herein.

The control part 17 controls respectively operations of the parts 11 to 16, that is, controls a series of process operations executed by the image forming device 10. The control part 17 is formed with a combination of a CPU (Central Processing Unit) for executing prescribed programs or a storage device for storing the prescribed programs or the like. That is, the control part 17 has functions as a computer. In order to realize the functions as the control part 17, the prescribed programs may be stored and provided in a recording medium that can be read by the computer before the prescribed programs are installed in the storage device, or may be distributed from an external part through the communication line.

On the other hand, the external device 20 is formed with the computer functioning as a host device of the image forming device 10, and includes a communication I/F part 21 to be connected to the image forming device 10 through the communication line 30 and a user I/F part 22 to be operated by the user of the external device 20.

In such a structure, in the external device 20, the user of the external device 20 operates the user I/F part 22 to set the process content information 14a and the operator information 14b. The communication I/F 21 transmits the process content information 14a and the operator information 14b set by using the user I/F part 22 to the image forming device 10 through the communication line 30.

Figure 2:
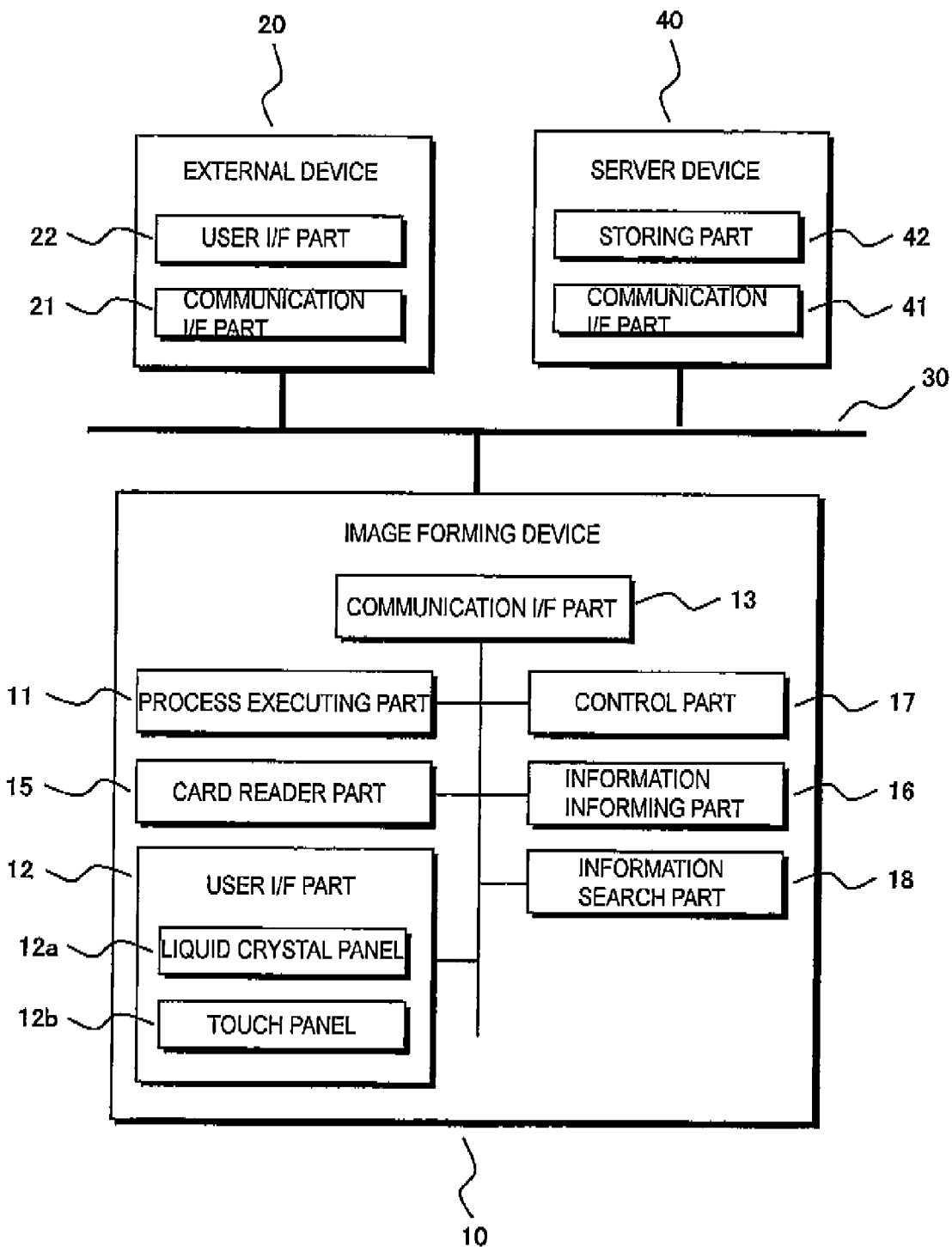
FIG. 2 is a functional block diagram showing another example of a schematic structure of the image forming system according to the present invention.

FIG. 2 is a functional block diagram showing other example of a schematic structure of an image forming system.

The illustrated image forming system includes a server device 40 in addition to an image forming device 10 and an external device 20 on a communication line 30.

The server device 40 is formed with a data server device present on the communication line 30 and includes a communication I/F part 41 to be connected to the image forming device 10 and the external device 20 through the communication line 30 and a storing part 42 for storing and holding process content information 14a and operator information 14b obtained by the communication I/F part 41 from the external device 20 so as to be coordinated with each other.

By such a structure, in the server device 40, the process content information 14a and the operator information 14b transmitted from the external device 20 are received by the communication I/F part 41 and stored and held in the storing part 42.

In the illustrated image forming system, since the server device 40 having such a structure exists on the communication line 30, the image forming device 10 may not have the storing part 14. However, the image forming device 10 includes, in place of the storing part 14, an information search part 18 that inquires the server device 40 about whether or not the operator information 14b of an operator corresponding to a user specified by a card reader part 15 is stored in the storing part 42 through the communication line 30, and obtains the operator information 14b and the process content information 14a coordinated therewith from the storing part 42 of the server device 40, when the operator information 14b is stored in the storing part 42.

Now, an example of a process operation in the image forming system constructed as described above will be described below.

Here, a case that the process content information 14a and the operator information 14b are stored and held not by the server device 40, but by the image forming device 10, that is, a process operation in the image forming system having the structure shown in FIG. 1 will be described as an example. It is assumed that the image forming system having the structure shown in FIG. 2 also carries out the same process operation as that described below except that the process content information 14a and the operator information 14b are stored and held by the server device 40 and the image forming device 10 obtains the information stored and held by the server device 40 from the server device 40 as required.

FIGS. 3A and 3B are flowcharts showing an example of a basic process operation in the image forming system. As shown in FIGS. 3A and 3B, the process operation in the image forming system includes a process operation in the external device 20 side and a process operation in the image forming device 10 side.

In the external device 20 side, the external device 20 accesses the image forming device 10 through the communication line 30 to inquire about information (refer it to as "various ability information", hereinafter) related to functions in the image forming device 10 (especially, a function met by the process executing part 11). In response to the inquiry, when the various ability information is transmitted from the image forming device 10, the external device 20 obtains the various ability information in the communication I/F part 21 (step 101, abbreviate step as "S", hereinafter) and displays the I/F screen specified in accordance with the obtained various ability information in the user I/F part 22 (S102). Then, the external device 20 allows the user operating the external device 20 to set the contents of the process that the process executing part 11 of the image forming device 10 is allowed to carry out on the I/F screen (specifically, the setting of parameter information necessary for carrying out the contents of the processes such as the number of output copies, a classification of color/monochrome, an output sheet size, etc. as well as the setting of the contents of the process themselves), set the executing time of the contents of the process, and set the operator of the contents of the process (S103 to S105). Here, the set operator may be the user himself or herself of the external device 20 or another person who receives a request from the user. Further, when the user of the external device 20 desires to be informed of the information by the information informing part 16 of the image forming device 10, the user is allowed to set the information transmitted part together with the setting of the operator. After these things are set, when a transmission permitting operation is carried out by the user, the communication I/F part 21 transmits information related to the set results, which is considered to be the process content information 14a and the operator information 14b, to the image forming device 10 (S106).

The obtaining process of the various ability information, the setting process of the executing time and the setting process of the information transmitted part of the processes respectively in the external device 20 side may be carried out as required. When the above-described processes are not necessary, they may be omitted. Further, when the external device 20 side can obtain or hold certificate information (for instance, electronic signature information)of the user operating the external device 20, the external device 20 may include the certificate information in the process content information 14a and transmit the certificate information to the image forming device 10.

On the other hand, in the image forming device 10 side, when the process content information 14a and the operator information 14b are transmitted from the external device 20, the communication I/F part 13 receives the information 14a and 14b (S201) and the storing part 14 stores and holds the received information 14a and 14b so as to be coordinated with each other (S202). Then, when the setting information of the information transmitted part is included in the operator information 14b, the information informing part 16 informs the set information transmitted part that these information 14a and 14b are obtained in the communication I/F part 13 and stored in the storing part 14 (S203). This information may be possibly transmitted at a time when the information 14a and 14b is respectively completely stored and held in the storing part 14. However, when the executing time of the contents of the process specified by the process content information 14a is designated, the information may be possibly transmitted at a timing corresponding to the executing time (for instance, a timing that the executing time draws near to a part located within a prescribed time).

After that, in the image forming device 10 side, the information is read in the card reader part 15 to specify the user of the image forming device 10 (S204). The control part 17 decides whether or not the operator information 14b of the operator corresponding to the specified user is stored in the storing part 14 (S205).

As a result, when the operator information 14b of the corresponding operator is not stored in the storing part 14, the control part 17 controls the user I/F part 12 to display the I/F screen defaulted in accordance with a predetermined setting and controls the process executing part 11 to carry out the process of the contents of the setting instructed from the I/F screen (S206). Namely, when the corresponding information 14a and 14b is not stored in the storing part 14, the control part 17 controls the process executing part 11 to carry out the process of the contents of the setting received by the user I/F part 12 as in the case of an ordinary process control.

Further, when the operator information 14b of the corresponding operator is stored in the storing part 14, the control part 17 obtains the operator information 14b and the process content information 14a stored so as to be coordinated therewith from the storing part 14 (S207). Then, the control part 17 controls the user I/F part 12 to display the I/F screen specified by the process content information 14a on the basis of the obtained information 14a and 14b respectively (S208) and controls the process executing part 11 to carry out the process of the contents of the setting by considering the user I/F part 12 to receive the contents of the setting specified by the process content information 14a (S209). Namely, when the corresponding information 14a and 14b is stored in the storing part 14, the user of the image forming device 10 (that is, the operator of the contents of the process set in the external device 20) can allow the image forming device 10 to execute the contents of the process only by specifying the user without requiring the setting operation of the contents of the process in the user I/F part 12.

Now, the above-described process operations by a series of procedures will be more specifically described by using first to fourth specific examples.

Initially, as the first specific example, a case will be described below that the external device 20 obtains the various ability information from the image forming device 10 and the external device 20 side sets a copying process carried out in the image forming device 10 in accordance with the obtained various ability information.

The external device 20 obtains from the image forming device 10 tray information for recognizing a size of a sheet that can be met by the image forming device 10 or information related to a possibility/impossibility to meet the color/monochrome as the various ability information in the image forming device 10. Then, the I/F screen on which the contents specified by the obtained various ability information are reflected is displayed in the user I/F part 22. By using the I/F screen, the user of the external device 20 is allowed to set the contents of the process (the parameter information) of the copying process carried out in the image forming device 10 and the operator of the contents of the process. When the contents of the process and the operator are set, the external device 20 transmits information related to the set results as the process content information 14a and the operator information 14b in, for instance, an HTML data form to the image forming device 10 as an object device to which the process is carried out.

The image forming device 10 receiving the process content information 14a and the operator information 14b from the external device 20 stores and holds the received information 14a and 14b respectively so as to be coordinated with each other. More specifically, the information 14a and 14b is allowed to queue on a process waiting queue in the storing part 14.

After that, when the user of the image forming device 10 (for instance, the user himself or herself of the external device 20) inserts a card into the card reader part 15 or carries out a log-in operation in the user I/F part 12 to specify the user, the image forming device 10 decides whether or not the operator information 14b of the operator corresponding to the specified user and the process content information 14a coordinated therewith are allowed to queue on the process waiting queue in the storing part 14, and extracts the queuing information 14a and 14b respectively when the queuing information exists. At this time, when the corresponding information 14a and 14b are present for a plurality of processes, information related to the priority of the contents of the process specified by each process content information 14a is interpreted to extract the information 14a and 14b of the highest priority. The priority may be possibly determined depending on, for instance, an order of queuing time. However, when the information related to the priority of the contents of the process is included in the process content information 14a, the executing order of the competitive contents of the process may be adjusted in accordance with the priority. For instance, the contents of the process whose importance are set to be high may be carried out preferentially to other contents of processes. Since the priority may be set or interpreted by using a well-known art, a detailed explanation thereof is omitted herein.

When the operator information 14b and the process content information 14a coordinated therewith are extracted in such a way, in the image forming device 10, the I/F screen specified by the extracted process content information 14a is displayed in the user I/F part 12 and the contents of the setting specified by the process content information 14a are considered to be received by the user I/F part 12. Thus, the user of the image forming device 10 sets a copy as an object to be processed in the image forming device 10 and merely presses down a start button in the user I/F part 12 of the image forming device 10, so that the image forming device 10 can start the copying process of the contents set in the external device 20. When the copying process is started, since the user I/F part 12 displays the I/F screen specified by the process content information 14a from the external device 20, the settings of various kinds of parameters can be changed on the I/F screen.

Subsequently, as the second specific example, a case will be described below that a copying process carried out in the image forming device 10 is set in the external device 20 side without obtaining the various ability information from the image forming device 10.

The external device 20 displays the I/F screen defaulted in accordance with a predetermined setting in the user I/F part 22. By using the I/F screen, the user of the external device 20 is allowed to set the contents of the process (the parameter information) of the copying process carried out in the image forming device 10 and the operator of the contents of the process. When the contents of the process and the operator are set, the external device 20 transmits information related to the set results as the process content information 14a and the operator information 14b in, for instance, an HTML data form to the image forming device 10 as an object device to which the process is carried out.

The image forming device 10 receiving the process content information 14a and the operator information 14b from the external device 20 stores and holds the received information 14a and 14b respectively so as to be coordinated with each other. More specifically, the information 14a and 14b is allowed to queue on a process waiting queue in the storing part 14.

After that, when the user of the image forming device 10 (for instance, the user himself or herself of the external device 20) inserts a card into the card reader part 15 or carries out a log-in operation in the user I/F part 12 to specify the user, the image forming device 10 decides whether or not the operator information 14b of the operator corresponding to the specified user and the process content information 14a coordinated therewith are allowed to queue on the process waiting queue in the storing part 14, and extracts the queuing information 14a and 14b respectively when the queuing information exists. At this time, when the corresponding information 14a and 14b are present for a plurality of processes, information related to the priority of the contents of the process specified by each process content information 14a is interpreted to extract the information 14a and 14b of the highest priority.

When the operator information 14b and the process content information 14a coordinated therewith are extracted in such a way, in the image forming device 10, the I/F screen specified by the extracted process content information 14a is displayed in the user I/F part 12 and the contents of the setting specified by the process content information 14a are considered to be received by the user I/F part 12. Thus, the user of the image forming device 10 sets a copy as an object to be processed in the image forming device 10 and merely presses down a start button in the user I/F part 12 of the image forming device 10, so that the image forming device 10 can start the copying process of the contents set in the external device 20.

However, the I/F screen and the contents of the setting on the I/F screen at this time are not based on the various ability information obtained from the image forming device 10. Accordingly, the contents of the setting may be possibly related to processing functions that are not met by the image forming device 10.

Thus, in the image forming device 10, when the I/F screen is displayed in the user I/F part 12, the control part 17 decides whether or not the process executing part 11 can carry out the process having the contents of the setting specified by the process content information 14a. Then, when the control part 17 decides that the process executing part 11 cannot carry out the process, for instance, like a case that although the process executing part 11 meets only a monochrome output, the process executing part 11 receives the process content information 14a having a color output as the contents of the setting, the control part 17 controls the user I/F part 12 to display a message to that effect and urges the user to change the contents of the setting. Namely, before the process is executed in the image forming device 10, the control part 17 controls the user of the image forming device 10 to change the settings of various kinds of parameters on the I/F screen of the user I/F part 12.

Subsequently, as the third specific example, a case will be described below that the user of the external device 20 requests other person to carry out an image reading process in the image forming device 10.

The external device 20 displays the I/F screen in the user I/F part 22 in accordance with the various ability information obtained from the image forming device 10 or without obtaining the various ability information and allows the user of the external device 20 to set the contents of the process (the parameter information) of the image reading process carried out in the image forming device 10 by using the I/F screen and the operator of the contents of the process. At this time, the user of the external device 20 is allowed to set address information (for instance, an electronic mail address of the user) as a transferred part of image data obtained in the image reading process, the certificate information of the user (for instance, the certificate information related to the electronic mail address of the user), information for specifying the operator as a person who is requested to carry out the image reading process (for instance, the name of the operator) and information of the information transmitted part to the operator (for instance, an electronic mail address of the operator). When the above-described things are set, the external device 20 transmits information related to the set results as the process content information 14a and the operator information 14b in, for instance, an HTML data form to the image forming device 10 as an object device to which the process is carried out.

The image forming device 10 receiving the process content information 14a and the operator information 14b from the external device 20 stores and holds the received information 14a and 14b respectively so as to be coordinated with each other. More specifically, the information 14a and 14b is allowed to queue on a process waiting queue in the storing part 14.

At this time, in the image forming device 10, when the process content information 14a and the operator information 14b are stored in the storing part 14, the information informing part 16 informs the information transmitted part that the information 14a and 14b is obtained in the communication I/F part 13 and stored in the storing part 14 in accordance with the information of the information transmitted part included in the operator information 14b. More specifically, an electronic mail informing that a request for a new image reading process comes to the image forming device 10 is prepared and transmitted to the electronic mail address of the operator.

After that, when the operator recognizing the contents of the information goes to a place where the image forming device 10 is installed and inserts a card into the card reader part 15 or carries out a log-in operation in the user I/F part 12 so that the image forming device 10 specifies the operator as the user of the image forming device 10, the image forming device 10 extracts the operator information 14b of the operator and the process content information 14a coordinated therewith from the storing part 14. Then, in the image forming device 10, the I/F screen specified by the extracted process content information 14a is displayed in the user I/F part 12 and the contents of the setting specified by the process content information 14a are considered to be received by the user I/F part 12.

At this time, when the certificate information is included in the operator information 14b, in the image forming device 10, the control part 17 controls the user I/F part 12 to display the certificate information. Further, the control part 17 may control the information informing part 16 to report the information of the certificate information. Accordingly, when the operator refers to the certificate information, the operator can recognize the user of the external device 20 as a person who requests the operator to carry out the image reading process and, what is, an impersonation can be prevented.

Further, at this time, the contents of the display presented by the user I/F part 12 may include a message to the operator who carries out the image reading process (for instance, a message such as "Place a copy in a direction for reading the copy and press a scan button.") Thus, the operator sets the copy as an object to be processed in the image forming device 10 and merely presses down a start button in the user I/F part 12 of the image forming device 10, so that the operator can start the image reading process of the contents set in the external device 20. During the log-in operation, when a state that an instructed process can be started is not obtained, such as a case that the operator does not have the copy, the operator may be allowed to press down a "hold" button in the user I/F part 12 so that the operator carries out the process afterward.

In such a way, when the image reading process is carried out, in the image forming device 10, the image data obtained by carrying out the image reading process is transmitted to the address of the transferred part specified by the process content information 14a.

A series of process operations as described above are carried out, so that the user of the external device 20 can request the operator as other person than the user to carry out the image reading process in the image forming device 10. Namely, when an instruction for the image reading process is transmitted to the image forming device 10 installed at a place remote from the external device 20, the image data of a document designated by the external device 20 side can be transferred to the address of the transferred part designated by the external device 20 side. Thus, the operator at the remote place can be requested to carry out the image reading process with a data stored place or a password being not known by the operator.

Subsequently, as the fourth specific example, a case will be described below that the user of the external device 20 allows the image reading process in the image forming device 10 to be carried out by designating the executing time thereof.

The external device 20 displays the I/F screen in the user I/F part 22 in accordance with the various ability information obtained from the image forming device 10 or without obtaining the various ability information and allows the user of the external device 20 to set the contents of the process (the parameter information) of the image reading process carried out in the image forming device 10 by using the I/F screen and the operator of the contents of the process. At this time, the user of the external device 20 is allowed to set information related to a time when the image reading process is to be carried out and information of the information transmitted part (for instance, an electronic mail address) to which is reported information that the time draws near. When the information related to the time is set, information related to a process reserved state may be possibly obtained from the image forming device 10 to receive the setting of the information related to the time only for what is called a space time on the basis of the obtained information. When the above-described things are set, the external device 20 transmits information related to the set results as the process content information 14a and the operator information 14b in, for instance, an HTML data form to the image forming device 10 as an object device to which the process is carried out.

The image forming device 10 receiving the process content information 14a and the operator information 14b from the external device 20 coordinates the received information 14a and 14b with each other, and stores and holds the received information 14a and 14b in the storing part 14 under a state that a relation of the information related to the executing time of the process to the set result of the information 14a and 14b is clarified.

More specifically, the coordination of the information 14a and 14b with the setting of the executing time of the process is clarified to allow the information 14a and 14b to queue on the process waiting queue in the storing part 14. Thus, a reservation for executing the process is added to the process waiting queue. At this time, when another reservation already enters at a time (for instance, a time difference is located within one minute) considered to be the same, the external device 20 may be informed about it together with a reservation number for another reservation.

After that, at a timing corresponding to the designated executing time of the process, more specifically, at a timing when the executing time of the process draws near to a part within a prescribed time, in the image forming device 10, the information informing part 16 informs the information transmitted part, in accordance with the information of the information transmitted part included in the operator information 14b, that the process content information 14a and the operator information 14b are obtained in the communication I/F part 13 and stored in the storing part 14 and the executing time of the process specified by the process content information 14a draws near.

Then, at the designated executing time of the process, in the image forming device 10, the user I/F part 12 is locked for a preset time (for instance, one minute) to make the operation unable and wait for the insertion of the card into the card reader part 15 of the image forming device 10 or the log-in operation in the user I/F part 12 by the operator of the process to be processed.

The operator recognizing the contents of the information by the information informing part 16 goes to the place where the image forming device 10 is installed, inserts a card into the card reader part 15 in the image forming device 10 having the user I/F part 12 whose operation is unable or carries out a log-in operation in the user I/F part 12 to specify the user. Thus, in the image forming device 10, the operator information 14*b* of the operator and the process content information 14*a* coordinated therewith are extracted from the storing part 14. Then, in the image forming device 10, the I/F screen specified by the extracted process content information 14*a* is displayed in the user I/F part 12 and the contents of the setting specified by the process content information 14*a* are considered to be received by the user I/F part 12. Namely, when the operator is specified within the preset time after the executing time of the process, the operator sets a copy as an object to be processed in the image forming device 10 and merely presses down a start button in the user I/F part 12 of the image forming device 10, so that the image reading process of the contents set in the external device 20 is carried out and image data obtained by carrying out the image reading process is transmitted to the address of a transferred part specified by the extracted process content information 14*a*. When the image reading process is carried out, since the user I/F part 12 displays the I/F screen specified by the process content information 14*a* from the external device 20, the settings of various kinds of parameters can be changed on the I/F screen.

On the other hand, when the operator cannot be specified with the preset time elapsing after the executing time of the process, in the image forming device 10, the reservation of the process whose execution is not started is canceled. However, only the coordination with the setting of the executing time of the process in the process waiting queue is canceled and the information 14*a* and 14*b* is not deleted from the process waiting queue, because the process based on the information 14*a* and 14*b* that is allowed to queue on the process waiting queue can be carried out when the operator is specified afterward.

During carrying out the reserved process, when it is the executing time of a reserved process separate from the above described reserved process (refer it to as a "next process", hereinafter), the start of the execution of the next process may be delayed until the process that is being carried out is completed. In this case, when the priority is set, the executing order of the competitive processes maybe adjusted in accordance with the setting of the priority.

Further, during carrying out an ordinary process that is not reserved, when the executing time of the reserved process draws near, for instance, a message showing that Mr. A reserves for the process from 14:00." may be displayed in the user I/F part 12 to inform the operator of the process that is being carried out about the presence of the reserved process. Then, at the executing time of the reserved process after such an information is supplied, the ordinary process that is being carried out is temporarily stopped to permit an interruption or the ordinary process is canceled. In such a way, the execution of the reserved process can be ensured at the executing time of the process and the reservation of a process time from the external device 20 can be effectively achieved.

A series of the above-described process operations are carried out so that the operator of the external device 20 can designate the executing timing of the contents of the process that the image forming device 10 is allowed to carry out in accordance with the information related to the executing time of the contents of the process. Namely, when the remote operation of the image forming device 10 is carried out from the external device 20, the execution of the process can be reserved.

In the embodiments, preferred specific examples of the present invention are described, however, the present invention is not limited to the contents thereof. Namely, the present invention is not limited to the contents described in the embodiments and may be changed within a scope without departing from the gist of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image forming device comprising:
a processor that executes a prescribed process;
a user interface unit that displays information related to the process executed by the processor, and that receives a setting of content of the process executed by the processor;
a communication unit that connects to an external device through a communication line, that obtains process content information as information related to content of a display and content of the setting in the user interface unit set by the external device, and that obtains operator information as information related to an operator of content of a process specified by the process content information;
a storage unit that stores the process content information and the operator information obtained by the communication unit so as to be correlated with each other and attached with a priority for each process to be executed by the processor;
a user specifying unit that specifies a user; and
a controller that, in a case where the user specified by the user specifying unit corresponds to the operator specified by the operator information stored in the storage unit, extracts the process content information having the highest priority from among the process content information stored in the storage unit in relation with the operator information, controls the user interface unit to display the display content specified by the process content information, and considers content of a setting specified by the process content information.

2. The image forming device as claimed in claim 1, wherein
the controller, in a case where information related to an executing time of the content of the process specified based on the process content information is included in the process content information obtained by the communication unit, at a timing corresponding to the executing time, extracts the process content information containing information related to the executing time as the process information having the highest priority among the process content information stored in the storage unit, controls the content of the display specified based on the process content information to be displayed on the user interface unit, and considers the content of the setting specified based on the process content information to be received by the user interface unit.

3. The image forming device as claimed in claim 1, wherein
the controller, in a case where information related to the priority of the content of the process specified based on the process content information is included in the process content information obtained by the communication unit, extracts the process content information stored in the storage unit by adjusting an executing order of competitive content of the process in accordance with the priority.

4. The image forming device as claimed in claim 1, wherein
the communication unit, before the communication unit obtains the process content information and the operator information from the external device, transmits the information related to the process executed by the processor to the external device.

5. The image forming device as claimed in claim 1, further comprising:
an information informing unit that informs an information destination specified based on the operator information that the communication unit has obtained and the storage unit has stored the process content information and the operator information.

6. The image forming device as claimed in claim 5, wherein
the information informing unit, in a case where a transmitter of the operator information is different from the operator specified by the operator information, informs the information destination of the operator specified based on the operator information.

7. The image forming device as claimed in claim 5, wherein
the information informing unit, in a case where the executing time of the contents of the process specified by the process content information is designated, informs the information destination specified based on the operator information at the timing corresponding to the executing time.

8. The image forming device as claimed in claim 5, wherein
the controller, in a case where certificate information is included in the operator information obtained by the communication unit, controls the user interface unit to display the certificate information or the information informing unit to inform about the certificate information.

9. An image forming system comprising:
an image forming device including:
    a processor that executes a prescribed process; and
    a user interface unit that displays information related to the process executed by the processor, and that receives a setting of content of the process executed by the processor; and
an external device that is connected to the image forming device through a communication line,
wherein
the image forming device further includes:
    a communication unit that obtains process content information as information related to content of a display and content of the setting in the user interface unit set by the external device, and that obtains operator information as information of an operator of content of a process specified by the process content information, from the external device;
    a storage unit that stores the process content information and the operator information obtained by the communication unit so as to be correlated with each other and attached with a priority for each process to be executed by the processor;
    a user specifying unit that specifies a user; and
    a controller that, in a case where the user specified by the user specifying unit corresponds to the operator specified by the operator information stored in the storage unit, extracts the process content information having the highest priority from among the process content information stored in the storage unit in relation with the operator information, controls the user interface unit to display the display content specified by the process content information, and considers that content of a setting specified by the process content information is accepted by the user interface unit.

10. An image forming system comprising:
an image forming device including:
    a processor that executes a prescribed process; and
    a user interface unit that displays information related to the process executed by the processor, and that receives a setting of content of the process executed by the processor;
a server device that is connected to the image forming device through a communication line; and
an external device that is connected to the image forming device through the communication line,
wherein
the server device further includes:
    an information obtainer that obtains process content information as information related to content of a display and content of a setting in the user interface unit set by the external device from the external device, and obtains operator information as information of an operator of content of a process based on the process content information; and
    a storage unit that stores the process content information and the operator information obtained by the information obtainer so as to be correlated with each other and attached with a priority for each process to be executed by the processor, and
the image forming device further includes:
    a user specifying unit that specifies a user;
    an information search unit that inquires the server device through the communication line as to whether or not the operator information of the operator corresponding to the user specified by the user specifying unit is stored in the storage unit and, in a case where the operator information is stored, obtains the process content information having highest priority among the operator information and the process content information correlated therewith; and
    a controller that controls the user interface unit to display content of a display specified based on the process content information based on the process content information obtained by the information search unit, and that considers content of a setting specified by the process content information is accepted by the user interface unit.

* * * * *